Figure 1:
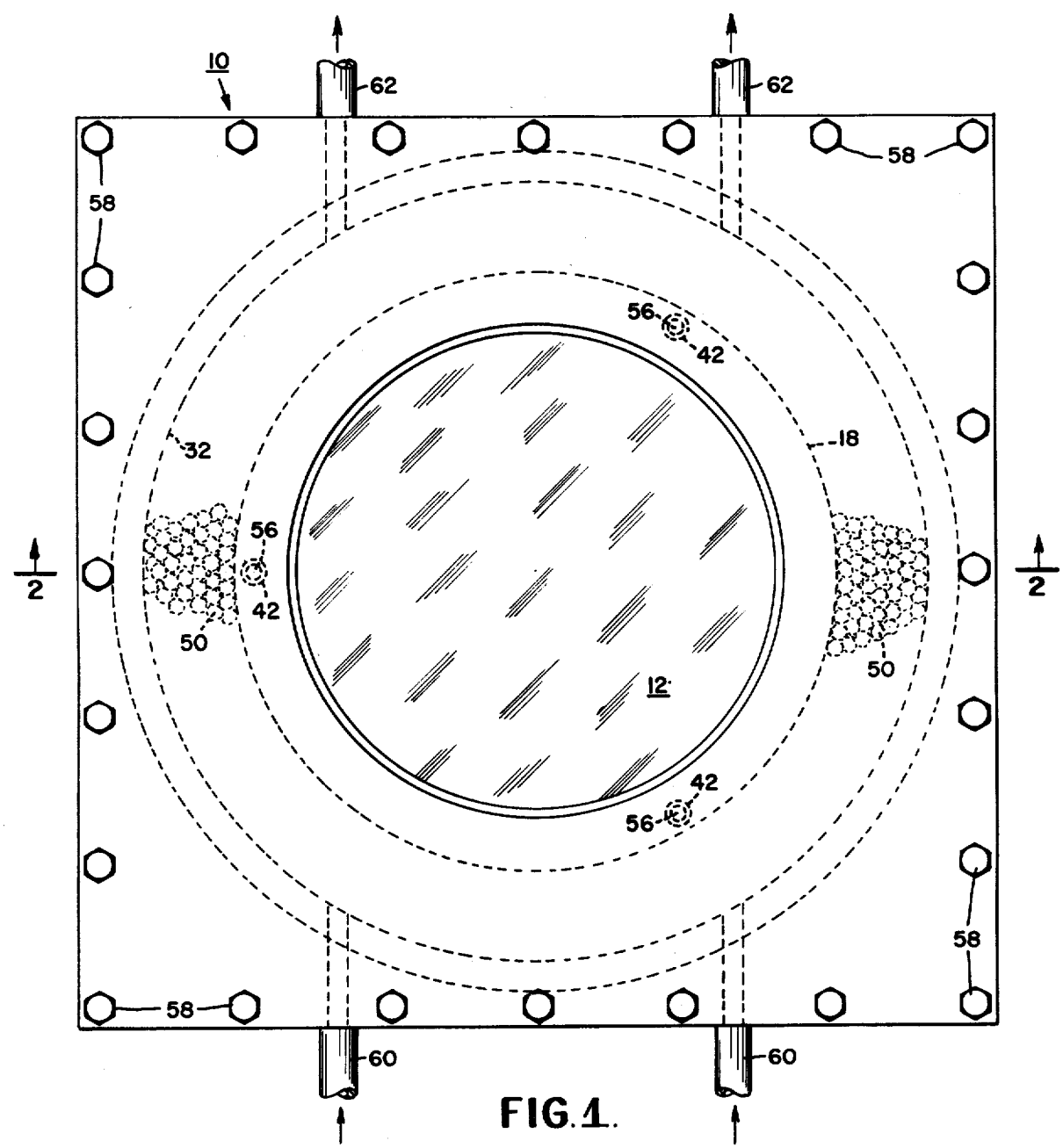

United States Patent [19]  
Lewis et al.

[11] 4,228,406  
[45] Oct. 14, 1980

[54] LASER APPARATUS

[75] Inventors: Owen Lewis, Fairport; Edmund M. Stogran, North Syracuse, both of N.Y.

[73] Assignee: The University of Rochester, Rochester, N.Y.

[21] Appl. No.: 904,690

[22] Filed: May 10, 1978

Related U.S. Application Data

[63] Continuation of Ser. No. 738,500, Nov. 11, 1976, abandoned.

[51] Int. Cl.² .............................................. H01S 3/02  
[52] U.S. Cl. ........................... 331/94.5 D; 331/94.5 T  
[58] Field of Search ................... 331/94.5 C, 94.5 D, 331/94.5 E, 94.5 F, 94.5 G

[56] References Cited

U.S. PATENT DOCUMENTS

| | | | |
|---|---|---|---|
| 3,404,349 | 10/1968 | Rigrod | 331/94.5 C |
| 3,562,662 | 2/1971 | Gould et al. | 331/94.5 G |
| 3,621,456 | 11/1971 | Young | 331/94.5 PE |
| 3,631,362 | 8/1968 | Almasi et al. | 331/94.5 |
| 3,679,929 | 7/1972 | Holm et al. | 315/3.5 |
| 3,725,813 | 4/1973 | Yasuda et al. | 331/94.5 D |

Primary Examiner—William L. Sikes  
Assistant Examiner—Leon Scott, Jr.  
Attorney, Agent, or Firm—Martin LuKacher

[57] ABSTRACT

Laser apparatus is described wherein an active laser element, such as the disc of a face-pumped laser, is mounted in a housing such that the weight of the element is supported by glass spheres which fill a chamber defined in the housing between the walls of the housing and the edges of the laser element. The uniform support provided by the spheres enable the chamber and the pump side of the laser element to be sealed without affecting the alignment or other optical properties of the laser element. Cooling fluid may be circulated through the sealed region by way of the interstices between the spheres. The spheres, and if desired also the cooling fluid may contain material which absorbs radiation at the wavelength of parasitic emissions from the laser element. These parasitic emissions enter the spheres through the interface along the edge surface of the laser element and it is desirable that the index of refraction of the spheres and cooling fluid be near the index of refraction of the laser element. Thus support, cooling, and parasitic suppression functions are all accomplished through the use of the arrangement.

14 Claims, 2 Drawing Figures

LASER APPARATUS

The Government of the United States of America has rights in this invention pursuant to Contract No. E 11-1)-2812 awarded by the U.S. Energy Research and Development Administration.

This is a continuation of application Ser. No. 738,500 filed Nov. 11, 1976; now abandoned.

The present invention relates to laser apparatus and particularly to apparatus for use in high power laser systems.

The invention is especially suitable for use in laser systems for providing high power laser beams which can be applied to a target containing a nuclear fusion fuel so as to produce nuclear fusion reactions. The invention is however adapted for use in generating and amplifying laser light for other purposes, such as communications and industrial applications.

A particularly suitable laser configuration for providing high power laser amplification is the so-called "face-pumped laser". Such devices include a disc or slab laser element containing an active laser material. The element has planar end surfaces which are large as compared to the disatance between the end surfaces across the edge of the slab. Optical pumping radiation can be applied to the laser element through one of the end surfaces. This surface may be referred to as being on the pump side while the opposite end surface may be referred to as being on the output side. When the laser element is pumped, particularly at the high energy levels requisite for high power laser gain, spurious or parasitic oscillations can result. These oscillations cause spurious emissions in a direction transverse to the path of the laser light through the laser element. Such spurious emissions cause a reduction in the output laser energy in that they utilize the pumping energy in a manner which does not contribute to the useful output of the laser. It is therefore desirable to suppress these spurious oscillations and emissions.

It is also desirable to provide cooling of the laser elements used in high power laser systems. The circulation of a liquid in contract with the laser elment serves to transfer the heat away from the element. This liquid must be circulated through a chamber around the element which is desirably closed through the use of seals such as "O" rings and the like. Such seals, however, may apply forces to the element which can produce internal stresses. The stresses can give rise to bending of the element and deviation of the surfaces, such as the faces of a face pump laser element, which produces optical distortion of the laser beam. It is therefore desirable to provide means for mounting the laser element which enables the use of seals without applying forces which could adversely affect the optical properties of the laser.

For further background information respecting face pumped laser systems, reference may be had to U.S. Pat. No. 3,534,291. Reference may also be had to U.S. Pat. No. 3,986,130, issued to John Soures and John Hoose, Ser. No. 513,364, which is assigned to the University of Rochester, for information respecting an active mirror face pumped laser of the type in which this invention may be used. Still further background information may be found in U.S. Pat. Nos. 3,794,929; 3,631,362; and 3,424,991, which are listed in the Soures and Hoose patent.

It is therefore an object of this invention to provide improved laser apparatus.

It is another object of the present invention to provide improved laser apparatus which provides high energy output.

It is a further object of the present invention to provide laser apparatus in which a laser element may be supported in a manner to reduce stresses which may adversely affect the optical properties of the element.

It is a still further object of the present invention to provide improved laser apparatus in which apparatus may be mounted in a manner to enable the circulation of a fluid for cooling the element without such mounting adversely affecting the optical properties of the element.

It is a still further object of the present invention to provide improved laser apparatus in which parasitic or spurious emissions from the laser element thereof can be suppressed.

It is a still further object of the present invention to provide improved laser apparatus in which a laser element is supported in a manner which avoids the introduction of stresses, permits cooling, and also suppreses parasitic or spurious emissions.

It is a still further object of the present invention to provide improved face pumped laser apparatus.

Briefly described, laser apparatus embodying the invention utilizes a laser element which can be excited to transmit laser radiation along a path through the element but which excitation may also result in spuriously emitted laser radiation in directions transverse to the desired path through the element. The laser may be used either as an oscillator or as an amplifier or laser radiation which is incident thereon. The laser element may be a slab or disc of a face pumped laser, say of the active mirror type in which incident radiation enters through the output side of the element and is reflected from the pump side of the element and transmitted after amplification again through the output side. The spurious emissions are in the direction towards the edges of the element in the case of the face pumped laser. In order to mount the laser element, a plurality of bodies, preferably small spherical bodies, are maintained as by a housing around the surfaces of the laser element. The bodies conform to the surfaces of the laser element and are in contact therewith. The bodies may be located in a chamber formed between a housing and the surfaces of the laser element through which the spurious radiation is emitted. The bodies contain material which absorbs radiation at the wavelength of the spuriously emitted radiation, and thus serves to absorb the radiation. Inasmuch as the bodies support the weight of the laser element, the housing may be sealed through the use of seals such as "O" rings without introducing stresses which may adversely affect the optical properties of the element. A cooling fluid may be circulated through the interstices between the bodies and along one or more of the faces of the laser element in order to cool the element. Desirably the bodies are made of material having the same index of refraction as the laser element. The cooling liquid may also have the same index of refraction as the laser element and may also contain material which absorbs radiation at the wavelength of the spuriously emitted radiation. Accordingly, not only is the laser element supported in a manner which does not adversely affect its optical properties (e.g. flatness of its faces) but further provides for cooling and suppresion of spurious radiation.

Figure 2:
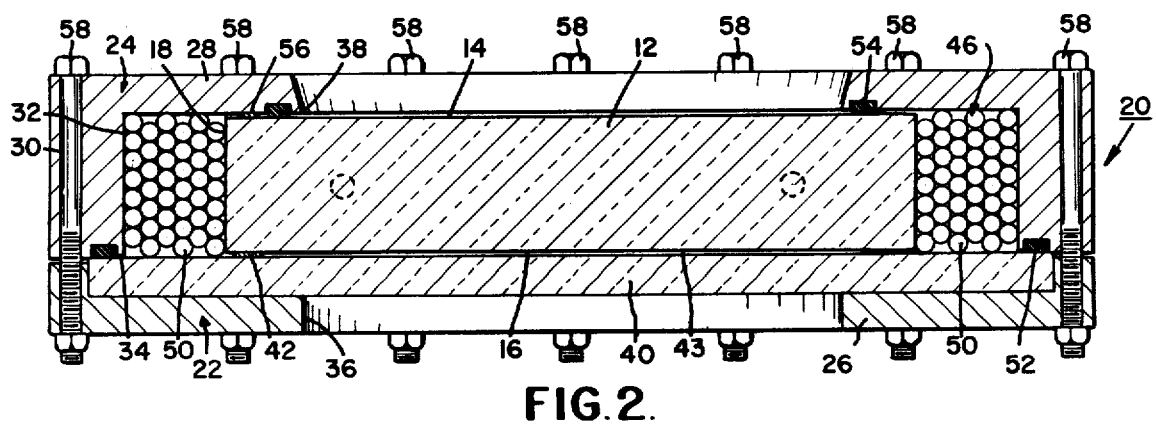

The foregoing and other objects and advantages of the invention will be more readily apparent from a reading of the following description in connection with the accompanying drawings in which FIG. 1 is a front view of laser apparatus embodying the invention and FIG. 2 is a sectional view taken along the line 2—2 in FIG. 1.

Referring to the drawings, there is shown an active mirror face pumped laser unit 10. Optical pumping means, such as an array of flash lamps of the type shown in the above referenced patents is used with this unit 10, but is not shown to simplify the illustration. An active laser medium is provided by a laser element 12 in the form of a disc-shaped slab. The element has, planar end faces 14 and 16 on the output and pump sides thereof, respectively. The edge 18 of the element extends between the end faces 14 and 16 and is in the form of a cylindrical surface. The material of the element may be a neodymium doped glass. The doping agent may be $Nd_2O_3$, which provides laser energy at a wavelength of 1.06 micrometers. The surface of the output end 14 is desirably coated with a thin film which transmits the laser energy at this wavelength (1.06 micrometers). A reflecting coating or film is provided on the surface of the pump side end face 16. Laser radiation is transmitted along a path through the element 12 from the output end face 14 to the reflective film on the pump end face 16 and backout of the output end. When the laser element is excited by the pumping radiation which is transmitted through the reflective film on the pump end face 16 (which film is transmissive to pumping energy which may be in the wavelength interval from 0.35 to 0.9 micrometers), the laser energy is amplified. The unit 10 may be part of a laser amplifier or oscillator, as desired. It is preferable to use lower power lasers as oscillators and the face pumped laser unit 10 for the purpose of amplifying the laser radiation. The unit 10 is especially adapted for use in an array of such units, as for example described in the above-referenced Soures and Hoose patent, for providing high energy laser beams which may be made incident upon a laser fusion target.

Mounting means for the laser element 12 is provided by a housing 20. The housing has two parts 22 and 24 on the pump side and output side of the unit 10, respectively. The parts 22 and 24 of the housing 20 when assembled together provide side walls 26 and 28 and a end wall 30. The interior surface 32 of the end wall is of cylindrical shape and defines a step 34, due to the end wall portions of the part 22 having a larger inner diameter than the end wall portion of the output side part 24 of the housing 20.

The pump side wall 26 has an aperture 36 and the output side wall 28 has another aperture 38. The apertures 36 and 38 are aligned with each other when the housing parts 22 and 24 are assembled as shown in the drawings. The diameter of the laser element disc 12 is larger than the diameter of the apertures 36 and 38 such that the side walls 26 and 28 overlap the end faces 14 and 16 of the laser element disc 12. The apertures 36 and 38 are also coaxial with the laser element disc 12.

A plate 40 of heat resistant glass, such as Pyrex, is disposed on the inside surface of the pump element side part 22. The pump end face 16 of the laser element disc 12 is spaced from the plate 40 by means of cushions 42 of soft material such as plastic foam. Three such cushions may suitably be provided, spaced 120° apart around the aperture 36. A gap 43, which may be a few millimeters in width, is defined between the plate 40 and the pump side end face 16 of the laser element 12.

A chamber 46 of generally tubular shape is defined in the housing 20 between the edge 18 of the laser element 12 and the housing 20. The walls of this chamber are defined by the plate 40, the interior surface 32 of the end wall 30, and a portion of the inner surface of the output side wall 28. This chamber is filled with a plurality of bodies in the form of spheres or balls 50. The diameter of these spheres and the dimension of the chamber 46 are selected such that a plurality of such spheres, suitably 5 or 6 spheres, are located in the radial direction between the edge 18 and the interior surface 32. The width of the chamber is somewhat greater than the thickness of the element 12 (viz., the length of the edge 18). A plurality of the spheres 50 are thus disposed in contact with the edge 18. The spheres are desirably made of material having a high degree of stiffness, preferably the spheres are made of glass. The glass contains, as by being doped, material which absorbs radiation at the wavelength of the spurious or parasitic emissions which are in directions transverse to the path of the laser radiation through the laser element. These directions are preferably radial directions; the spurious radiation being emitted through the edge 18 of the element 12. These parasitic or spurious emissions are in the infra red region for the neodymium glass laser materials and may be at wavelengths of 1.06 micrometers, 0.88 micrometers, and 1.35 micrometers. Copper presents high absorption or attenuation of these wavelengths and the spheres 50 may be doped so as to contain copper. It is desirable to avoid refraction of the radiation at the interfaces where the spheres 50 contact each other and also make contact with the edge 18 of the laser element 12. Accordingly, it is desirable that the spheres 50 have the same index of refraction as the laser element 12. This is readily accomplished by utilizing glass as the material from which the spheres 50 are made. (e.g., the same neodymium glass as is used for the laser element 12 being suitable).

In order to provide for high power operation of the laser unit 10, means for cooling are provided. The chamber 46 and the gap 43 are sealed by means of an "O" ring 52 which is located in a groove in the step 34. Another "O" ring seal 54 in a groove in the side wall 28 which is spaced inwardly from the aperture 38 provides a seal between the output end face 14 of the laser element 12 and the inner surface of the output side wall 28. In order to locate or reference the planar end faces 14 and 16 of the element 12, there are provided three locator buttons 56. These are disposed opposite to the cushions 42.

The parts 22 and 24 of the housing 20 are secured together by means of bolts 58 which bring the parts together in their outer wall regions in metal-to-metal contact. The laser element is extended between the cusions 42 and the "O" ring 54 which applies a slight yieldable force thereto. This force is insufficient to impart any significant stress to the laser element. Accordingly, the distortion of the flatness of the end faces 14 and 16 and other optical properties, which may be affected by stress, are eliminated. The spheres 50 surround the edge 18 of the laser element 12 and behave much like a fluid so as to uniformly support and suspend the laser element upon the spheres 50. Accordingly, any need to rely upon the "O" ring 54 and cushions 42 for support is eliminated and forces applied to the laser element in the axial direction through the "O" ring 54 are insufficient to impart stress to the laser element 12 which would adversely affect its optical properties.

One or more inlet ports are provided on the bottom side of the housing and one or more outlet ports 62 are provided on the top side of the housing. A cooling liquid is circulated through these ports and passes through the interstices between the spheres 50 and along the gap 43. In order to prevent reflection which might re-direct the spurious emmissions back into the laser element 12, this cooling liquid preferably has the same index of refraction as the laser element 12. This is of course the same index of refraction as that of the spheres 50. In order to assist in absorbing the spurious emissions the cooling liquid may also contain a material which absorbs radiation at the wavelength of the spurious radiation. A suitable liquid may be a ferric chloride solution or the solution described in Dube and Boling, Applied Optics, April 1974 at page 699. Other suitable liquids may be tricresyl phosphate or zinc chloride.

The assembly sequence for the unit 10 may be as follows: The housing part 24 is placed with the output side wall 28 down. The "O" ring 54 is inserted. Then, the laser element 12 is placed upon the locators 56. The "O" ring 52 is inserted and the cushions 42 are placed on the pump side end wall 16. The chamber 46 is then filled with the spheres. The housing part 22 and the plate 40 are then set upon the housing part 24 such that the outer end of the plate 40 rests on the step 34. The bolts 58 are then inserted and fastened so as to assemble the unit together. Additional spheres may be dropped through the inlets and outlets 60 and 62 so as to completely fill the chamber. Then the hoses for the circulation of the fluid through the chamber 44 and the gap 43 are connected. The unit may then be assembled with the optical pumping means so as to provide a complete laser amplifier module.

From the foregoing description it will be apparent that there has been provided improved laser apparatus whereby a laser element may be mounted by means which perform a number of functions (viz., uniform support without interference with optical parameters; cooling; and parasitic suppression).

While a preferred embodiment of the invention has been described it will be apparent that variations and modifications thereof within the scope of the invention will undoubtedly suggest themselves to those skilled in the art. For example, other laser element shapes, such as rods, may be supported through the use of a plurality of bodies, such as the spheres or balls which extend along the cylindrical surface of the rods. These spheres do not only provide support for the rod, but will also serve to suppress parasitic or other spurious emissions. Accordingly, the foregoing description should be taken merely as illustrative and not in any limited sense.

What is claimed is:

1. In laser apparatus having a laser element for emitting laser radiation in the form of a solid body containing active laser material, said laser element body having first and second surfaces at the ends thereof and a third surface extending longitudinally between said first and second surfaces, an improved mounting for said laser element comprising a housing defining with said third surface a chamber adjacent to said third surface, said chamber being spaced radially outward from said third surface and being disposed along said third surface, a multiplicity of spherical bodies, said spherical bodies being disposed in contact with each other and extending along said third surface and radially outward to completely fill said chamber so as to support the weight of said laser element body in said housing, said spherical bodies having diameters such that a plurality of said spherical bodies extend longitudinally along said third surface and another plurality of said spherical bodies extend radially outward from said third surface, said plurality of spherical bodies which extend along said third surface being in contact therewith.

2. The invention as set forth in claim 1 wherein said spherical bodies have a high degree of stiffness.

3. The invention as set forth in claim 2 wherein said spherical bodies are glass.

4. The invention as set forth in claim 3 wherein said laser element is glass solid throughout.

5. The invention as set forth in claim 1 wherein said housing is spaced from said laser element body and said spherical bodies provide the sole support for the weight of said laser element body in said housing.

6. The invention as set forth in claim 1 wherein spurious radiation is emitted through said third surface and said spherical bodies comprise material which absorbs radiation spuriously emitted from said laser element through said third surface.

7. The invention as set forth in claim 6 wherein said active laser material is comprised essentially of glass and said spherical bodies are balls comprised essentially of glass, said balls having substantially the same index of refraction as said laser material.

8. The invention as set forth in claim 7 wherein means are provided for circulating a liquid coolant through the interstices between said balls and with said liquid in contact with said third surface.

9. The invention as set forth in claim 8 wherein said liquid has substantially the same index of refraction as said laser material.

10. The invention as set forth in claim 9 wherein said liquid also has absorption for radiation at the wavelength of said spuriously emitted laser radiation.

11. The invention as set forth in claim 1 wherein said laser element is a cylindrical slab comprised of active glass laser material having planar end faces which define said first and second surfaces, said third surface being the cylindrical surface of said slab, said housing being disposed entirely around said slab, said housing having first and second side walls adjacent said end faces and an end wall, said side walls having arpertures facing said end faces, said end wall being spaced from the cylindrical surface of said slab so as to define said chamber between said end wall and said cylindrical surface, said chamber encompassing said cylindrical surface, said spherical bodies being balls of diameter much smaller than the width of said slab between said end faces, the height of said chamber between said end wall and said cylindrical surface being about equal to a plurality of said sphere diameters which extend radially outward from said third surface.

12. The invention as set forth in claim 11 further comprising a glass plate having an area larger than the end-face area of said slab and disposed between one of said end faces and one of said first side wall of said housing, said plate being spaced from said one end face to provide a gap between said one end face and one side of said plate, said gap being in communication with said chamber, said housing having a step overlapping the outer edge of said one side of said plate, a seal disposed between said step and said one side of said plate and surrounding said slab, another seal around said aperture and between the other of said end faces and the said second side wall of said housing which is disposed adjacent to said other of said end faces, said seals sealing said gap and said chamber, and means for circulating a liquid coolant through said gap and the interstices between said balls.

13. The invention as set forth in claim 12 further comprising a plurality of locator members spaced from each other around the aperture in said other side wall between said other end face and said other side wall for locating the plane of said end faces with respect to the plane of said side wall.

14. The invention as set forth in claim 13 wherein said housing has two parts, one of which contains said one side wall and the other which contains said other side wall, a plurality of cushion members in said gap, said cushion members being spaced from each other around said aperture in said one side wall, said housing parts being joined together with said seals and said cushion members compressed without applying substantial stress to said slab.

* * * * *